United States Patent [19]

Mullins

[11] Patent Number: 4,961,878
[45] Date of Patent: Oct. 9, 1990

[54] CORROSION INHIBITOR FOR A CLOSED AQUEOUS COOLING SYSTEM

[75] Inventor: Michael A. Mullins, Wayne, N.J.

[73] Assignee: Drew Chemical Corporation, Boonton, N.J.

[21] Appl. No.: 268,915

[22] Filed: Nov. 9, 1988

[51] Int. Cl.$^5$ .................. C23F 11/08; C09K 5/00
[52] U.S. Cl. .................. 252/389.3; 252/389.54; 252/389.61; 252/389.62; 252/75
[58] Field of Search .................. 252/389.54, 389.61, 252/389.62, 392, 389.3, 75; 422/15

[56] References Cited

U.S. PATENT DOCUMENTS

| | | | |
|---|---|---|---|
| 2,815,328 | 12/1957 | Green et al. | 252/75 |
| 3,335,096 | 8/1967 | Hatch | 252/389 |
| 3,948,792 | 4/1976 | Watsen et al. | 252/181 |
| 4,325,829 | 3/1982 | Duggleby et al. | 252/109 |
| 4,359,413 | 11/1982 | Ward et al. | 252/527 |
| 4,452,715 | 6/1984 | Hirozawa | 252/75 |
| 4,778,655 | 8/1988 | Greaves | 422/15 |

OTHER PUBLICATIONS

*Evaluation of Molybdate as an Inhibitor in Automotive Engine Coolants*, Corrosion/82, (Paper No. 265), 3/82 (Houston, TX).

Drew Principles of Industrial Water Treatment pp. 147–151.

"Automotive Engine Coolant Inhibitors for Aluminum", by R. R. Wiggle, National Assoc. of Corrosion Engrs., June, 1981, pp. 13–18.

"Evaluation of Molybdate as an Inhibitor in Automotive Engine Coolants", by M. S. Vukasovich et al., Aug., 1983, pp. 25–33.

ASTM D-1384, "Standard Method for Corrosion Test for Engine Coolants in Glassware", Bk. of ASTM Standards, Part 30, p. 213 (1976).

*Primary Examiner*—John F. Terapane
*Assistant Examiner*—Valerie D. Fee
*Attorney, Agent, or Firm*—Walter H. Schneider

[57] ABSTRACT

A composition for inhibiting metal corrosion in a closed aqueous cooling system comprising an aqueous mixture of (a) a nitrate, (b) a silicate, (c) an acrylate polymer, (d) an amine oxide and (e) tolyltriazole. A preferred embodiment also includes a molybdate.

4 Claims, No Drawings

CORROSION INHIBITOR FOR A CLOSED AQUEOUS COOLING SYSTEM

BACKGROUND OF THE INVENTION

1. Field of the Invention

The present invention relates to corrosion inhibition. More particularly, the present invention relates to corrosion inhibition in closed aqueous cooling systems. Still more particularly, the present invention relates to a composition and method for controlling corrosion in closed aqueous cooling systems.

2. Description of the Prior Art

Closed aqueous cooling systems with which the present invention is concerned are used in a variety of industrial situations such as, for example, gas and diesel engines, gas turbines, electric transformers, chilled water systems for air cooling, and the like. Such closed systems are usually constructed of a variety of dissimilar metals including copper, aluminum, cast iron, mild steel, brass, and the like, which can result in galvanic corrosion of the system. Sodium chromate has been a widely used corrosion inhibitor for such systems as has sodium nitrite, the latter usually being buffered with sodium borate making it particularly suited for use in systems comprising ferrous materials. More recently, however, the use of chromate inhibitors has been severely limited by Federal and State regulations because of their toxicity. Nitrite-based inhibitors are subject to attack by nitrifying bacteria which oxidize them to nitrates with subsequent microbiological growth and loss of efficacy with respect to ferrous materials. Silicate, nitrate and molybdate-based inhibitors, tolyltriazole, and polymeric based-inhibitors have all proved to be effective to one degree or another toward specific metals but are usually used in conjunction with borates, phosphates and nitrites.

A more detailed consideration of closed aqueous cooling system corrosion inhibitors is given in "Drew Principles of Industrial Water Treatment", pp. 147–151, published by Drew Chemical Corporation. The effectiveness of various inhibitors and combinations of inhibitors in aluminum closed aqueous cooling systems may be found in a paper entitled "The Effectiveness of Automotive Engine Coolant Inhibitors for Aluminum" by R. R. Wiggle et al published in National Association of Corrosion Engineers, June 1981, pp. 13–18. An investigation of molybdate, phosphate and borate inhibitors used in conjunction with nitrate and tolyltriazole to protect aluminum cooling systems is reported in a paper entitled "Evaluation of Molybdate as an Inhibitor in Automotive Engine Coolants" by M. S. Vukasovich, et al, August 1983, pp. 25–33. U.S. Pat. Nos. 2,815,328 and 3,335,096 disclose the use of sodium borate and sodium nitrate inhibitors in closed cooling systems while the use of various polymers in combination with silicate, nitrite, nitrate, borate and mercaptobenzothiazole is disclosed in U.S. Pat. No. 3,948,792.

SUMMARY OF THE INVENTION

Notwithstanding that the corrosion problem inherent in closed aqueous cooling systems has been widely investigated, there exists a continuing demand for improved means for protecting such systems against corrosion. Particularly, there is a continuing need for a nitrite, borate and phosphate-free corrosion inhibiting composition which is especially effective in minimizing the corrosion of aluminum, mild steel and cast iron, the principal metals found in closed aqueous cooling systems. It is, therefore, the object of this invention to fulfill this need.

DESCRIPTION OF THE PREFERRED EMBODIMENT

The composition according to this invention comprises an aqueous mixture of (1) a nitrate, (2) a silicate, (3) an acrylic polymer, (4) an amine oxide and (5) tolyltriazole. A modification of this composition constituting a preferred embodiment of the invention comprises the inclusion in the above defined mixture of a molybdate which is known to be highly effective toward cavitation corrosion.

The nitrate and silicate components can be used in the form of their alkali metal salts, usually sodium, and will each be used in an amount of about 1–20 parts by weight, preferably 3–10 parts, based on the weight of the composition.

The acrylic polymer used in accordance with the composition of this invention is an acrylate or methacrylate polymer having a molecular weight of about 1000–5000. A polymer found to be particularly effective is a polyacrylate commercially available from American Cyanamid Company under the trademark Cyanamer P-70 and having a molecular weight of approximately 1000. The acrylic polymer generally comprises from about 1–10 parts by weight, usually about 2–5 parts, of the composition.

The amine oxide component of the composition is a tertiary amine oxide, e.g. trimethylamine oxide, dimethylhexadecylamine oxide, and dimethylcocoamine oxide, or an alkylarylamine oxide, e.g., dimethylaniline oxide. An amine oxide found to be particularly effective is bis(2-hydroxyethyl)cocoamine oxide commercially available from Akzo Chemie America under the trademark Aromox C/12. The amine oxide component will generally be used in the composition in an amount of 1–20 parts, usually about 3–10 parts, by weight.

Tolyltriazole is used in the mixture in a general range of 1–10 parts by weight, usually about 2–5 parts.

When a molybdate is employed, as in the preferred composition, it will be used as an alkali metal salt, preferably the sodium salt. Its content will range from 1–20 parts by weight, a preferred range being about 3–10 parts.

The general and preferred compositions of the corrosion inhibitor according to this invention, therefore, can be tabulated as follows:

| Component | General Range | Preferred Range |
|---|---|---|
| Nitrate | 1–20 parts | 3–10 parts |
| Silicate | 1–20 parts | 3–10 parts |
| Acrylic polymer | 1–10 parts | 2–5 parts |
| Amine oxide | 1–20 parts | 3–10 parts |
| Tolyltriazole | 1–10 parts | 2–5 parts |
| Molybdate | 1–20 parts | 3–10 parts |
| Water | Balance | Balance |

The corrosion inhibitor composition according to this invention is incorporated in the cooling medium of a closed cooling system in an amount effective to prevent, or at the least minimize, corrosion of the various metal parts of the system. This amount will vary and will depend upon the metallic composition of the particular system being protected as well as the composition of the cooling medium used in the system. Generally, the amount of corrosion inhibitor composition will be at least about 7000 ppm of coolant, but usually not more than about 20000 ppm beyond which no added protection is obtained. A practical range effective in most systems is about 5000–12000 ppm.

The present invention is further illustrated by the following Example in which all parts are by weight unless otherwise noted.

EXAMPLE

The corrosion inhibitor of this invention was tested in accordance with the test procedure prescribed in ASTM D-1384 "Standard Method for Corrosion Test for Engine Coolants in Glassware" set forth in detail in the Book of ASTM Standards, Part 30, American Society for Testing and Materials, Phila., Pa., p.213, (1976). The corrosion inhibitor compositions identified in Table I were tested on the six metal specimens identified in the following Table II, these metals being those which are usually present in automotive cooling systems. Test coupons of these metals were assembled in the test coolant in a manner so that they could be subjected to galvanic corrosion. The test coolant was a 33.3% ethylene glycol/water solution. The coolant was held at 88° C. and the test conducted for 336 hours. The degree of corrosion of the metal coupons was measured in terms of weight loss per coupon. Results appear in the following Table II.

TABLE I

| Component | Inhibitor I (Parts by Wt) | Inhibitor II (Parts by Wt) | Inhibitor III (Parts WT) |
|---|---|---|---|
| Na Molybdate Dihydrate | 10 | 0 | 10 |
| Na Nitrate | 6 | 6 | 6 |
| Na Silicate | 3 | 5 | 3 |
| Amine Oxide (Aromox C/12) | 5 | 10 | 0 |
| Polyacrylate (Cyamamer P-70) | 2 | 2 | 2 |
| Tolyltriazole | 2.15 | 4.3 | 2.15 |
| Water | 71.85 | 72.70 | 76.85 |

TABLE II

| | | Metal Wt Loss (Mg) | | | | | |
|---|---|---|---|---|---|---|---|
| Inhibitor | PPM | Al | Cu | Solder | Yellow Brass | Mild Steel | Cast Iron |
| Control | | 41.0 | 0.9 | 1.0 | 2.3 | 109.0 | 313.0 |
| I | 10000 | 0.0 | 1.9 | 4.3 | 1.6 | 1.0 | 3.9 |
| II | " | 1.0 | 1.4 | 5.1 | 1.2 | 0.6 | 3.2 |
| III | " | 4.6 | 1.3 | 2.6 | 1.4 | 1.1 | 43.0 |

The efficacy of the corrosion inhibitor according to this invention is particularly evident with respect to the protection provided aluminum, mild steel and cast iron, the metals constituting the major components of most closed aqueous cooling systems. The effectiveness provided by the amine oxide is illustrated by a comparison of the substantially lower cast iron corrosion rates for Inhibitors I and II, in which it is present, to that of Inhibitor III, in which it is absent. This effect of the amine oxide is particularly surprising in light of the fact that the Aromox C/12 used in the testing has been described in published literature only as having non ferrous metal corrosion inhibiting characteristics. Because of the cast iron protection provided by the formulation containing an amine oxide, the latter is considered an essential component of the inhibitor composition of this invention.

The results obtained with or without the presence of sodium molybdate in the composition are essentially the same. Nevertheless, the presence of molybdate is preferred because of its known characteristic of protecting against cavitaton corrosion.

While the nitrate, silicate, tolyltriazole and acrylate polymer are each known to separately have corrosion inhibiting properties with respect to specific metals, these inhibitors are usually employed in conjunction with nitrites, borates or phosphates all of which are objectionable for known reasons as earlier herein considered. It is an additional advantage of this invention, therefore, that excellent corrosion protection is obtained in accordance with this invention without the presence of any of these objectionable ingredients.

Reference in this disclosure to details of the specific embodiments is not intended to restrict the scope of the claims which themselves recite those features regarded as essential to the invention.

I claim:

1. An aqueous composition for inhibiting the corrosion of metals in a closed ferrous and aluminum-containing aqueous cooling system consisting of (a) 1–20 parts of an alkali metal nitrate; (b) 1–20 parts of an alkali metal silicate; (c) 1–20 parts of an amine oxide; (d) 1–10 parts of an acrylate or methacrylate polymer of about 1000–5000 molecular weight; (e) 1–10 parts of tolyltriazole; and (f) the balance water, all parts by weight based on the total weight of the composition.

2. An aqueous composition according to claim 1 consisting of (a) 3–10 parts of sodium nitrate; (b) 3–10 parts of sodium silicate; (c) 3–10 parts of bis(2-hydroxyethyl)-cocoamine oxide; (d) 2–5 parts of polyacrylamide of about 1000 molecular weight; (e) 2–5 parts of tolyltriazole; and (f) the balance water.

3. An aqueous composition for inhibiting the corrosion of metals in a closed ferrous and aluminum-containing aqueous cooling system consisting of (a) 1–20 parts of an alkali metal nitrate; (b) 1–20 parts of an alkali metal silicate; (c) 1–20 parts of an amine oxide; (d) 1–10 parts of an acrylate or methacrylate polymer of about 1000–5000 molecular weight; (e) 1–10 parts by weight of tolyltriazole; (e) 1–20 parts of an alkali metal molybdate; and (f) the balance water, all parts by weight based on the total weight of the composition.

4. An aqueous composition for inhibiting the corrosion of metals in a closed ferrous and aluminum-containing aqueous cooling system consisting of (a) 3–10 parts of sodium nitrate; (b) 3–10 parts of sodium silicate; (c) 3–10 parts of bis(2-hydroxymethyl)cocoamine oxide; (d) 2–5 parts of polyacrylamide of about 1000 molecular weight; (e) 2–5 parts by weight of tolyltriazole; (e) 3–10 parts of soidum molybdate; and (f) the balance water, all parts by weight based on the total weight of the composition.

* * * * *